United States Patent
Ning

(10) Patent No.: US 10,628,373 B2
(45) Date of Patent: Apr. 21, 2020

(54) SYSTEMS AND METHODS FOR TRANSMITTING AN ACCESS REQUEST VIA A FLEXIBLE REGISTER ACCESS BUS

(71) Applicant: Marvell World Trade Ltd., St. Michael (BB)

(72) Inventor: Xiongzhi Ning, Karlsruhe (DE)

(73) Assignee: Marvell International Ltd., Hamilton (BM)

( * ) Notice: Subject to any disclaimer, the term of this patent is extended or adjusted under 35 U.S.C. 154(b) by 465 days.

(21) Appl. No.: 15/364,503

(22) Filed: Nov. 30, 2016

(65) Prior Publication Data

US 2017/0154010 A1 Jun. 1, 2017

Related U.S. Application Data

(60) Provisional application No. 62/261,640, filed on Dec. 1, 2015.

(51) Int. Cl.
*G06F 13/42* (2006.01)
*G06F 13/364* (2006.01)
*H04L 12/741* (2013.01)

(52) U.S. Cl.
CPC ........ *G06F 13/4295* (2013.01); *G06F 13/364* (2013.01); *G06F 13/4247* (2013.01); *H04L 45/74* (2013.01)

(58) Field of Classification Search
CPC .. G06F 9/3802; G06F 9/3885; G06F 9/30134; G06F 9/30167; G06F 9/3013
USPC ...................................................... 710/116
See application file for complete search history.

(56) References Cited

U.S. PATENT DOCUMENTS

| | | | |
|---|---|---|---|
| 6,073,233 A | 6/2000 | Chapman | |
| 2008/0189522 A1* | 8/2008 | Meil | G06F 9/30079 712/220 |
| 2014/0052929 A1* | 2/2014 | Gulati | G06F 12/0815 711/141 |
| 2014/0082238 A1* | 3/2014 | Ahmad | G06F 13/42 710/110 |
| 2014/0173160 A1 | 6/2014 | Li et al. | |
| 2014/0298408 A1* | 10/2014 | Sastry | G06F 12/1458 726/1 |

(Continued)

OTHER PUBLICATIONS

"Device Control Register Bus 3.5, Architecture Specifications," IBM, Jan. 27, 2006, retrieved from the internet at https://www-01.ibm.com/chips/techlib/techlib.nsf/techdocs/2F9323ECBC8CFEE087 2570F4005C5739/$file/DcrBus.pdf, retrieved on Jul. 31, 2014, 50 pages.

*Primary Examiner* — Titus Wong

(57) ABSTRACT

Some embodiments described herein provide a method for transmitting an access request via a flexible register access bus. An access request may be received to access resource on an integrated circuit. The access request may be translated to a request packet having a data format compliant with the flexible register access bus. A routing path may be determined for the request packet based on a target register associated with the request packet. The request packet may be transmitted via the routing path to the target register. Information within the request packet may be translated to a local access protocol for the target register. Access to the resource may then be obtained via the target register based on the local access protocol.

18 Claims, 7 Drawing Sheets

(56) References Cited

U.S. PATENT DOCUMENTS

2016/0140065 A1* 5/2016 Sanzone ............... G06F 13/364
710/110

* cited by examiner

SYSTEMS AND METHODS FOR TRANSMITTING AN ACCESS REQUEST VIA A FLEXIBLE REGISTER ACCESS BUS

CROSS-REFERENCE TO RELATED APPLICATION

This disclosure claims the benefit of U.S. Provisional Patent Application No. 62/261,640, filed Dec. 1, 2015, which is hereby incorporated by reference in its entirety.

FIELD OF USE

This disclosure relates to a data transmission bus on a system-on-a-chip (SOC) chip, and specifically, a flexible register access bus.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

A system on chip (SOC) is an integrated circuit that integrates all components of a computer or other electronic system into a single chip. For example, the SOC includes digital, analog, mixed-signal, and radio frequency functions on the same single chip. The SOC usually integrates different Internet Protocol (IP) components with different data types, and each IP component normally has its own register module that is used to configure and to monitor the IP component itself. In this case, when the SOC hosts a large number of IP components and each IP components requires a separate register module, the SOC may not have enough physical space to place all the components and their respective register modules via a conventional bus, because the number of devices connected to the conventional bus is limited. Thus, the size challenge may limit the number of components the SOC can host and thus the functional capacity of the SOC is restricted. In addition, timing closure at the backend may be difficult to achieve because the path between the bus and IP components on the SOC could be long. When the large number of IP components are connected to a serial bus, a significant latency may be experienced, which impairs the performance of the SOC.

SUMMARY

Some embodiments described herein provide a method for transmitting an access request via a flexible register access bus. An access request may be received to access resource on an integrated circuit. The access request may be translated to a request packet having a data format compliant with the flexible register access bus. A routing path may be determined for the request packet based on a target register associated with the request packet. The request packet may be transmitted via the routing path to the target register. Information within the request packet may be translated to a local access protocol for the target register. Access to the resource may then be obtained via the target register based on the local access protocol.

In some implementations, the request packet includes an identifier identifying the target register and an application packet having data relating to the local access protocol.

In some implementations, the routing path includes a plurality of interconnected request cells that the request packet is passed through, and at least one of the plurality of interconnected request cells is connected to the target register.

In some implementations, each request cell from the plurality of request cells has a first communication port for transmitting the request packet, and a second communication port for transmitting a clear signal.

In some implementations, each request cell includes an identifying number that identifies a position of the respective request cell in a topology of the plurality of request cells.

In some implementations, the request packet includes information of the identifying number, and the routing path is determined based on the identifying number.

In some implementations, a request clear signal may be generated via the target register to indicate the target register is ready to receive a next request packet.

In some implementations, a completion packet is generated via the target register, and the completion packet is routed via a completion node to a completion buffer to indicate that the access request is completed.

In some implementations, the completion packet includes a number identifying the completion packet as associated with the access request.

In some implementations, the flexible register access bus is connected to a plurality of registers, each of the plurality of registers having a respective local access protocol. A next access request may be received to access a different resource via a different target register on the integrated circuit, and the next access request may be converted via the flexible register access bus to comply with a different local access protocol associated with the different target register.

Some embodiments described herein further provide an apparatus for transmitting an access request via a flexible register access bus. The apparatus includes a bridge component, and a request node. The bridge component is configured to: receive an access request to access resource on an integrated circuit, translate the access request to a request packet having a data format compliant with the flexible register access bus, and determine a routing path for the request packet based on a target register associated with the request packet. The request node is configured to route the request packet to the target register. The target register configured to: translate information within the request packet to a local access protocol, and provide access to the resource based on the local access protocol.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

This disclosure describes methods and systems for a flexible register access bus (FRAB) on a system on a chip (SOC). In some embodiments, the FRAB a may be built upon an extensible structure including a number of cell modules, as further illustrated in FIGS. 3-4. Each cell, e.g., a request cell or a completion cell, in the FRAB architecture may be connected to three other blocks, i.e. another request cell, another completion cell or an IP register module. The interconnected structure may reduce backend efforts for timing closure. In this way, the FRAB may provide the feasibility of register access to different IP register blocks located in a sizable chip.

Figure 3:
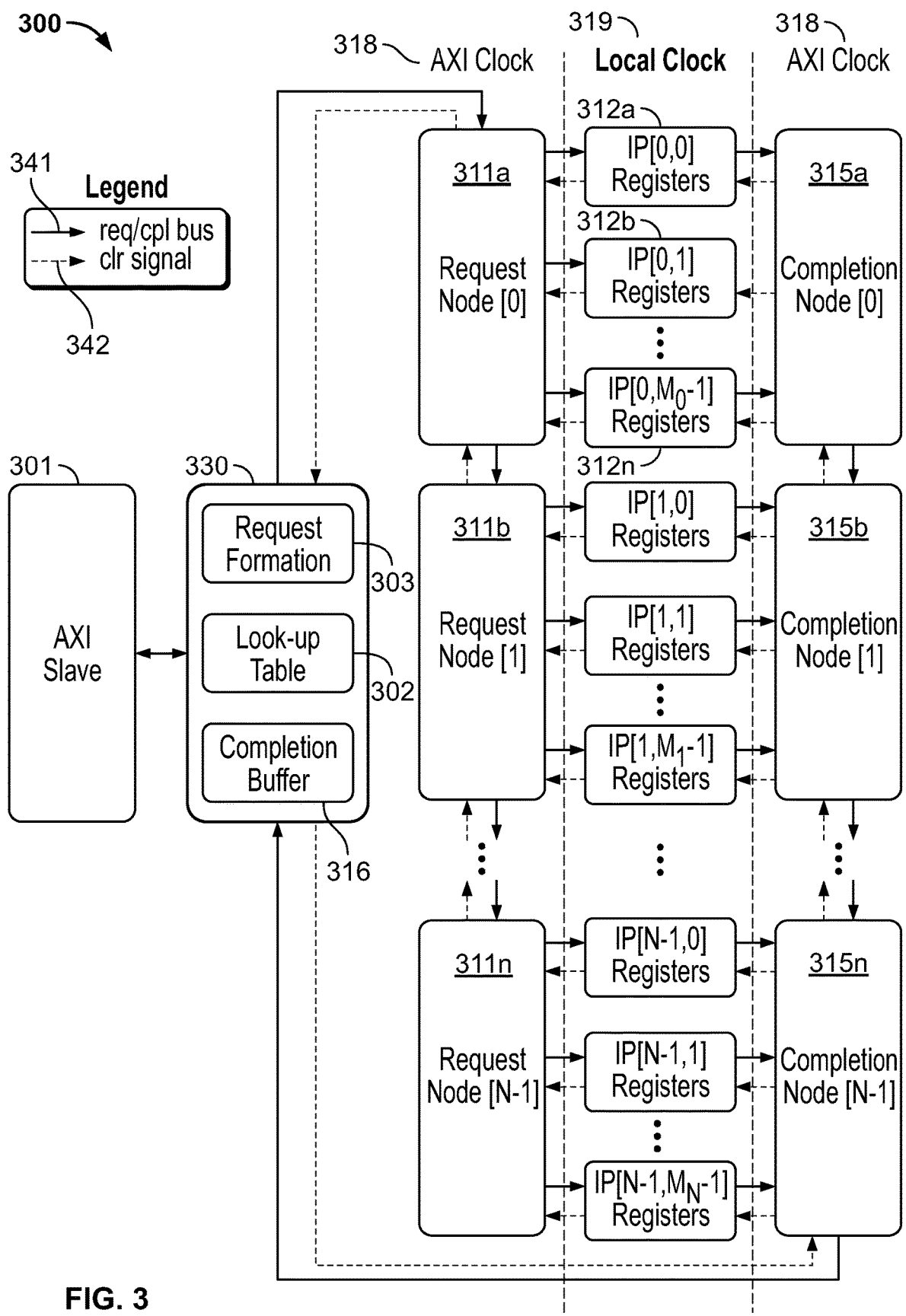
FIG. 3 provides a block diagram illustrating an example structure 300 of the FRAB 205, according to some embodiments described herein.
Figure 4:
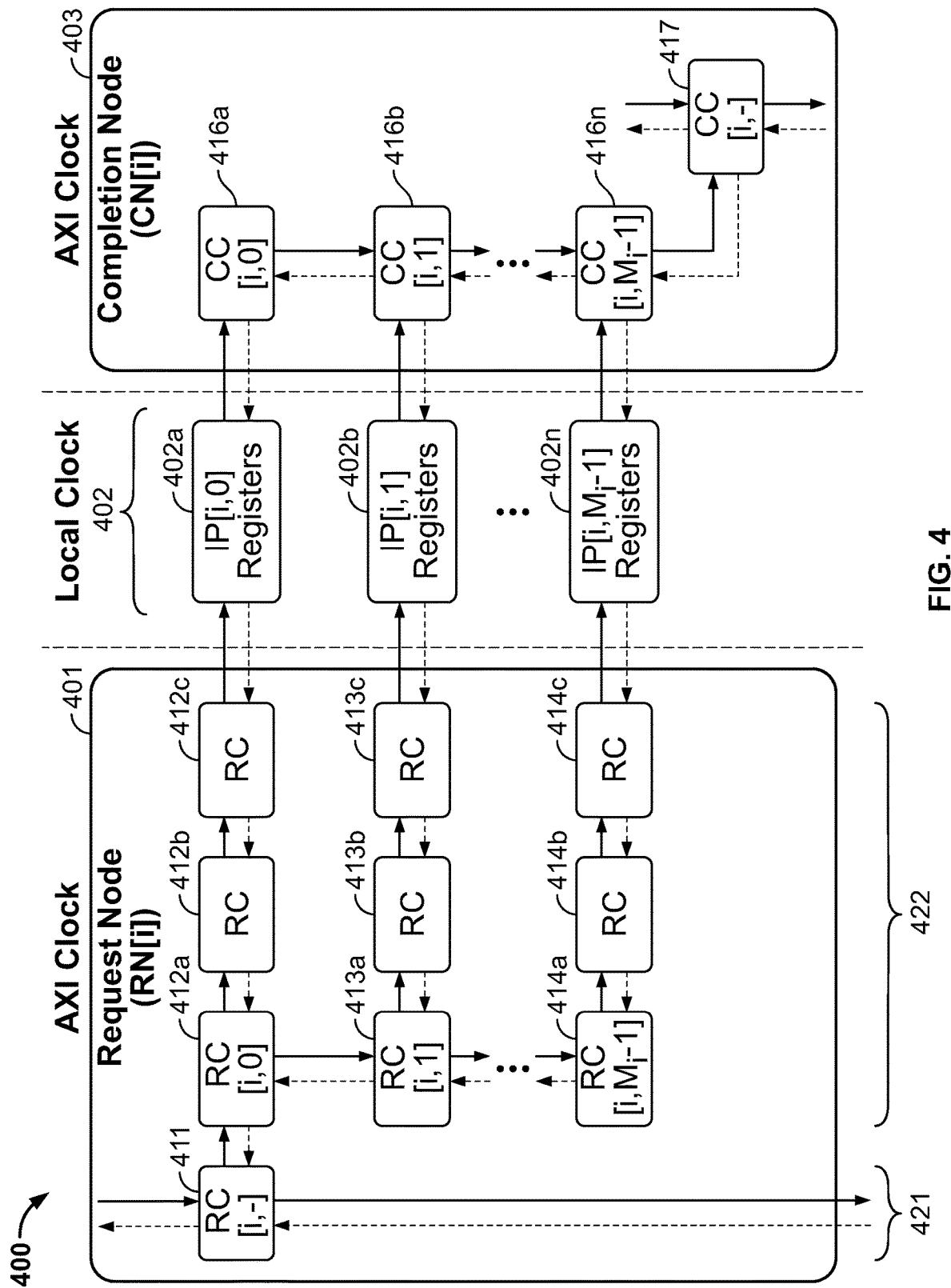
FIG. 4 is a block diagram illustrating an example structure of a node 400 of the FRAB 205, according to some embodiments described herein.

In one embodiment, an identifier (ID) is assigned to each of the request cells and completion cells to facilitate routing of an access request through the FRAB. The FRAB topology and how the IDs are assigned to different request cells or completion cells, may be determined by the number and the distribution (e.g., floorplan) of IP registers. As shown in FIGS. 3-4, both request and completion chains are separated and uncoupled so that the FRAB can reduce the impact of a slow IP register module. A request/completion packet is transferred through the main chain and the sub-chain. This can reduce the latency for both request and completion. In some implementations, the sub-chain can be extended to have an additional sub-chain, and thus the number of chain levels can be extended. The number of chain levels may correspond to the number of ID parts in the ID field.

In some implementations, the number of request cells/completion cells in the same chain level can be extended, which determines the width of its corresponding ID part for this chain level, as further illustrated in FIG. 3. All chains are based on generic request cell or completion cell module. In this way, the implementation and the extension of the FRAB can be flexible by just adding or removing the request cells or the completion cells. The flexible register access is based on a combination of register addresses, IDs and TAGs. For example, an application packet in a request packet can be flexibly specified based on register access protocol for specific IPs. In this way, different IP Register modules may be connected to the same FRAB.

In one implementation, an IP register module may have its own request cells as buffer in order to store the request packets. The number of such request cells can be extended to improve performance. In this way, the pipeline operations can be improved and blocking probability is reduced in the main chain or sub-chain. For a timing critical path between two request cells (or two completion cells), an arbitrary number of request cells (or completion cells) may be added as buffer to the respective path to relax the timing, without significantly affecting the connection quality.

Figure 1:
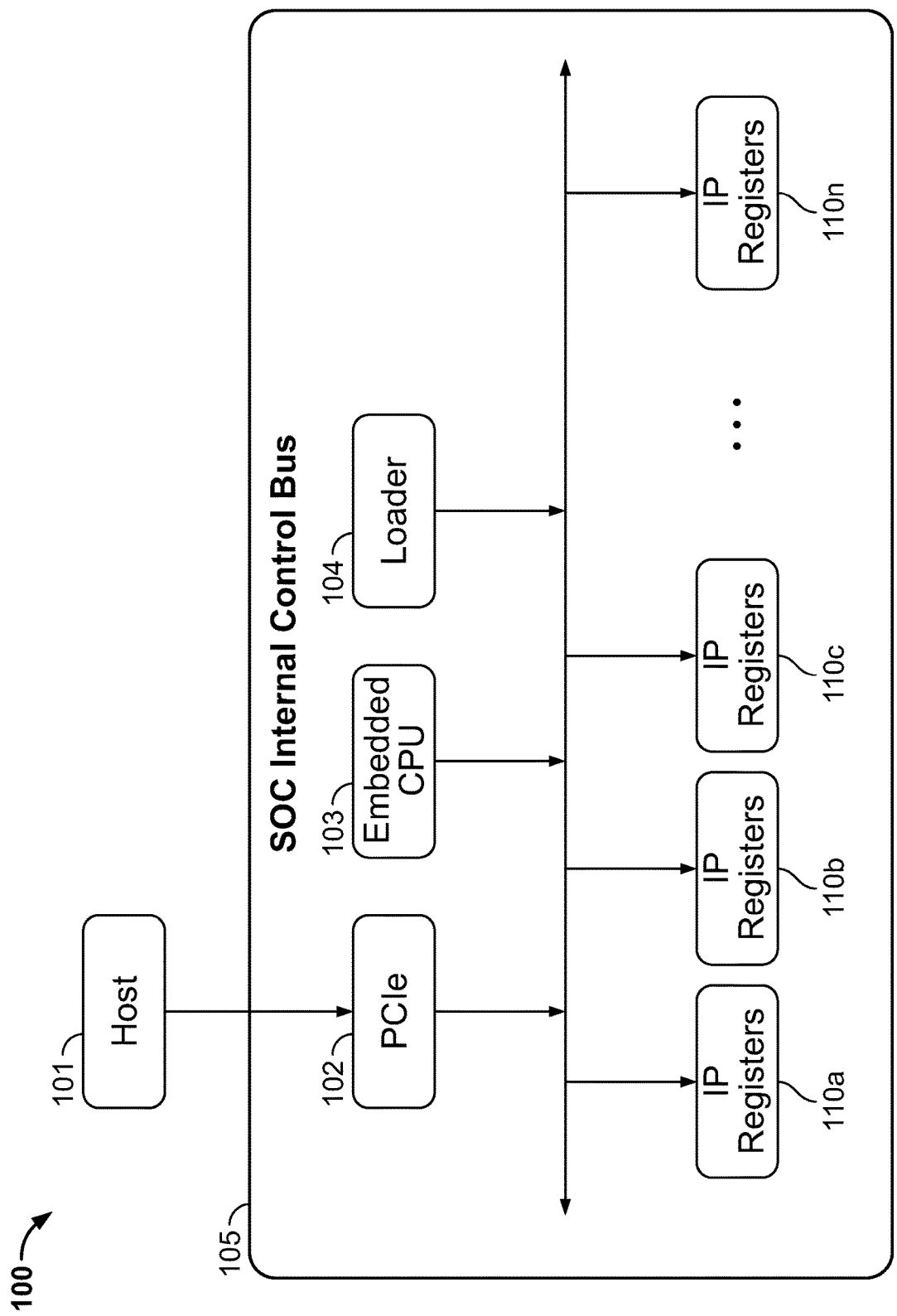
FIG. 1 is a block diagram of an example SOC system 100 with existing internal control bus.

FIG. 1 is a block diagram of an example SOC system 100 with existing internal control bus. As shown in FIG. 1, the SOC host system 101 employs an internal control bus 105 such as an advanced extensible interface (AXI) bus, a peripheral component interconnect (PCI) bus 102, and/or the like, to provide an access way for various components on the SOC to access the software from host system 101, or to access firmware from an embedded central processing unit 103 (CPU) or programming loader 104.

In one embodiment, various IP register modules 110*a-n* may be connected to such internal control bus 105 in a single chip. However, when the SOC integrates a large number of IP components, the capacity of internal bus 105 may limit the increasing big number of integrated components. For example, the internal bus 105 may only be able to host a limited number of IP components, i.e. IP register modules. In addition, when parallel bus is used for the internal control bus 105, timing closure may be difficult to achieve for the backend system. Also, a long latency may be experienced when a serial bus is used for the internal control bus 105.

Figure 2:
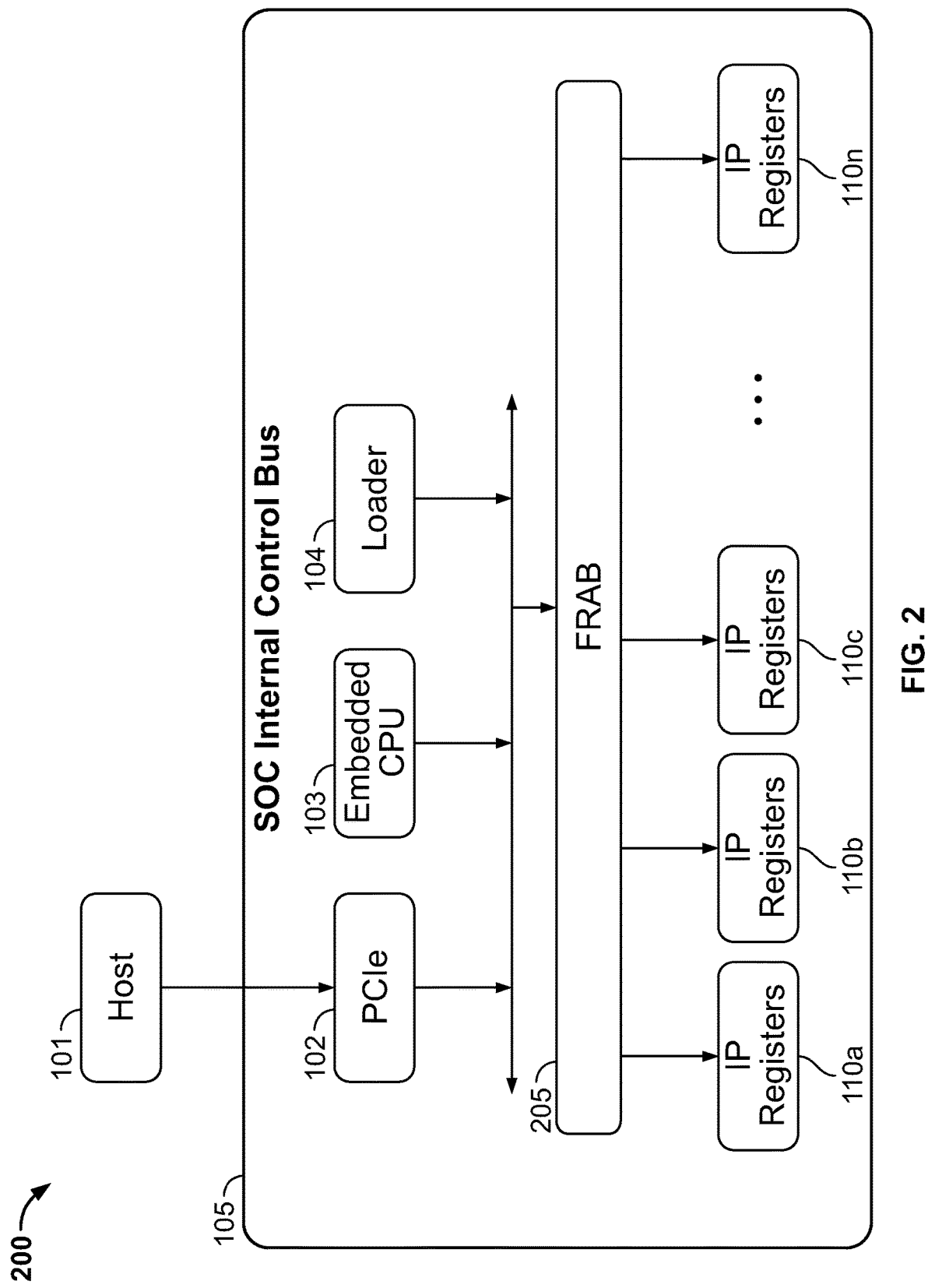
FIG. 2 provides a block diagram of an example SOC system 100 with a flexible register access bus (FRAB), according to some embodiments described herein.

FIG. 2 provides a block diagram of an example SOC system 100 with a flexible register access bus (FRAB), according to some embodiments described herein. As shown in FIG. 2, a FRAB is employed as part of the SOC internal control bus 105, and the IP register modules 110*a-n* are connected to the FRAB fabric 205. In this way, the IP register modules 110*a-n* can communicate with the embedded CPU 103 or the programming loader 104 via the FRAB 205.

FIG. 3 provides a block diagram illustrating an example structure 300 of the FRAB 205, according to some embodiments described herein. In some embodiments, as shown in FIG. 2, an AXI control bus used as an internal control bus 105 may be used to connect host PCIe 102, embedded CPU 103 and the loader 104. The FRAB 205 connected to the AXI Control Bus 105 may operate as an AXI slave interface 301. The FRAB can also be connected to any other control bus.

A register access request coming from an AXI control bus 105 may be issued by the host system 101, embedded CPU 103, or the loader 104, etc. As shown in FIG. 3, the register access request is first sent to an AXI to FRAB bridge 330. The AXI to FRAB bridge 300 may have three main modules, a request formation module 303, a lookup table 302 and a completion buffer 316.

The request formation module 303 may take the request information from the access request and map the register access request into a FRAB request. For example, a filed "reqvalid" is asserted only when all request packet fields are available. A request cell in the request node 311*a* is the first request cell in the main chain connected to the request formation module 303. When the request cell is empty and the request packet is available, a "reqclr" signal is asserted. Then the request packet is moved into the next cycle of the FRAB chain. The tracking information for the request may be generated and forwarded to the lookup table block 302.

A TAG, e.g., a number assigned to a given FRAB request to distinguish completions for this request from other requests, may be generated for each new FRAB request. A new FRAB request can be generated only if there is free TAG available. TAG entries may be shared for both read and write requests.

The lookup table 302 is connected between the request formation module 303 and the completion buffer 316, which keeps the tracking information of access requests. The lookup table 302 may monitor the FRAB completions corresponding to the previous issued FRAB requests. In some implementations, the lookup table 302 may have a limited number of entries. Each entry may correspond to a TAG number. When no free entry is left in the lookup table, the FRAB fabric may halt accepting any further requests. An occupied entry is released when its request has been completed in the AXI Slave interface 301.

The completion buffer 316 is shared for completion read data, and completion status from the FRAB chains (e.g., see completion nodes 315a-n). The completion buffer 316 has a depth which is equal to the number of lookup entries. Each completion buffer entry may correspond to a TAG number and a lookup table entry.

When all completion data related to a FRAB request are received in completion buffer 316, the corresponding AXI slave 301 responses are generated. After the completion of the AXI responses, the TAG, lookup table entry and completion buffer resources may be released. The completion status from FRAB is mapped into the response status of the AXI control bus 300.

In one implementation, when the register access request is mapped into a FRAB request, the request packet is then transmitted through the request node chain including request nodes 311a-n to its target IP register module(s). For example, the request node 311a may transmit a request packet to the respective IP register modules 312a-n. When the request has been completed at the IP register modules 312a-n, a completion packet is generated and transferred through the completion node chain including completion nodes 315a-n to a completion buffer 316, which is connected to the AXI Slave interface 301.

The FRAB request packet is routed to the target IP register module by a "reqid" field included in this packet. Each request packet may contain an application packet that comprises a dedicated register access protocol for the respective targeted IP register module. In this way, different register interface protocols can operate with the same FRAB. It is noted that in FIG. 3, connection buses between different modules and/or cells, are shown with a solid line 341, if the connection bus is used to send request/completion packets; or the connection bus is shown with a dashed line 342, for transmitting a clear signal.

In one implementation, the request node chain 311a-n and the completion node chain 315a-n may run at the same clock domain as internal control bus, i.e. the AXI clock 318. The IP registers 312a-n may run at the local clock 319 of the SOC system.

FIG. 4 is a block diagram illustrating an example structure of a node 400 of the FRAB 205, according to some embodiments described herein. For example, the node 400 has a main chain and a sub-chain. The FRAB node 400 may include three parts: a request node 401 (represented by RN[i]), a completion node 403 (represented by CN[i]), and a number $M_i$ of IP register modules 402 (e.g., similar to the IP register modules 312a-n in FIG. 3). Here the index i represents the position of the respective FRAB node in the hierarchy of nodes on the FRAB fabric.

The request node 401 may be built up of request cells 411, 412a-c, 413a-c and 414a-c. The Completion Node may be composed of completion cells 416a-n and 417. Both the request cell (RC) and the completion cell (CC) have a single stage of register buffering, which are designed as generic modules and used for RNs or CNs. Each request cell or completion cell is connected up to 3 other blocks, i.e. either another request cell, another completion cell or an IP register module. Thus on the floorplan of the SOC chip, the FRAB architecture can facilitate register access to different IP register modules 402 on a silicon chip of a large size, as the request nodes and completion nodes may be expanded by adding new nodes. Timing closure efforts may also be reduced because the request nodes 401 and the completion nodes 402 use the same AXI clock.

As shown in FIG. 4, a request node 401 contains one request cell (RC[i, -] 411) which is located in the main chain 421, and $M_i$ request cells (RC[i, 0] 412a, RC[i, 1] 413a, ..., RC[i, $M_i$–1] 414a) in the sub-chain 422. Here $M_i$ represents the number of the request cells in the sub-chain of Node i. The index array [x, y] indicates the position of request cells in the FRAB hierarchy as a two-dimensional coordinate system, where the index x stands for the request cell position in the main chain 421 and the index y stands for the request cell position in the sub-chain 422. A request packet may be routed via the main chain 421 and sub-chain 422 structure, which may significantly reduce the routing latency. Further aspects of the structure of a request cell is discussed in FIG. 5.

As shown in one example in FIG. 3, if there are N FRAB nodes and if each has M request cells and M completion cells in the sub-chain, up to N×M IP register modules can be connected to the FRAB 300. In FIG. 4, the request cells 412a, 413a or 414a in the sub-chain 422 may be connected to IP Register modules 402 through two request cells 412b-c, 413b-c or 414b-c, which are used as buffer to store two register accesses. The number of such request cells 412b-c, 413b-c or 414b-c may be increased, e.g., instead of using two request cells as buffering, a different number such as three, four, five, etc. request cells may be used, to eliminate backpressure in the main chain 421 and sub-chain 422 and to achieve better performance. Such request cells can also be removed to save resource and space when the performance requirement is less demanding.

Continuing on with FIG. 4, a completion node 403 (CN[i, -]) contains $M_i$ completion cells (CC[i, 0] 416a, CC[i, 1] 416b, CC[i, $M_i$–1] 416n) located in the sub-chain of node i and one completion cell (CC[i, -] 417) in the main chain. Similar to the notations used for the request node 401, $M_i$ represents the number of the completion cells in the sub-chain; the index array [x, y] indicates the position of completion cells in the FRAB hierarchy; index x stands for the position of the completion cell in the main-chain and index y represents the position of the completion cell in the sub-chain. By using the main chain and sub-chain to route a completion packet, the routing latency may be reduced significantly.

In some implementations, each completion cell 416a-n in the sub-chain may be connected directly to a respective IP Register module in 402. The completion packet is generated by the IP Register module 402. When the completion cell in the sub-chain is available, a completion application packet is sent from the IP register module 402 through an X interface, as further illustrated in FIG. 6.

In one embodiment, the IP register module 402 may act as a wrapper that contains the local IP registers 402a-n and a specific interface to the respective request cells (e.g., 412c, 413c, 414c, etc.) and the completion cells 416a-n. When the IP register (e.g., 402a) receives a request packet from the request cell 412c, the IP register 402a may assert a "reqclr" signal for one local clock cycle as soon as the IP register 402a accepts the request. Then the request packet will be mapped into a local register access protocol to access the local IP registers.

The FRAB architecture may use an identifier (ID) routing mechanism to transfer the request packet. The ID may be a number assigned to a request cell or a completion cell to identify their position in the FRAB topology, e.g., the main chain 421 and the sub-chain 422. For example, each completion packet may contain a unique ID to identify its corresponding request cell in the sub-chain. A TAG number, e.g., a number assigned to a given FRAB request to distinguish completions for this request from other requests, may be extracted from its request packet and used to identify the completion for the corresponding request. Further detail of the FRAB routing mechanism is discussed in connection with FIG. 7.

Figure 5:
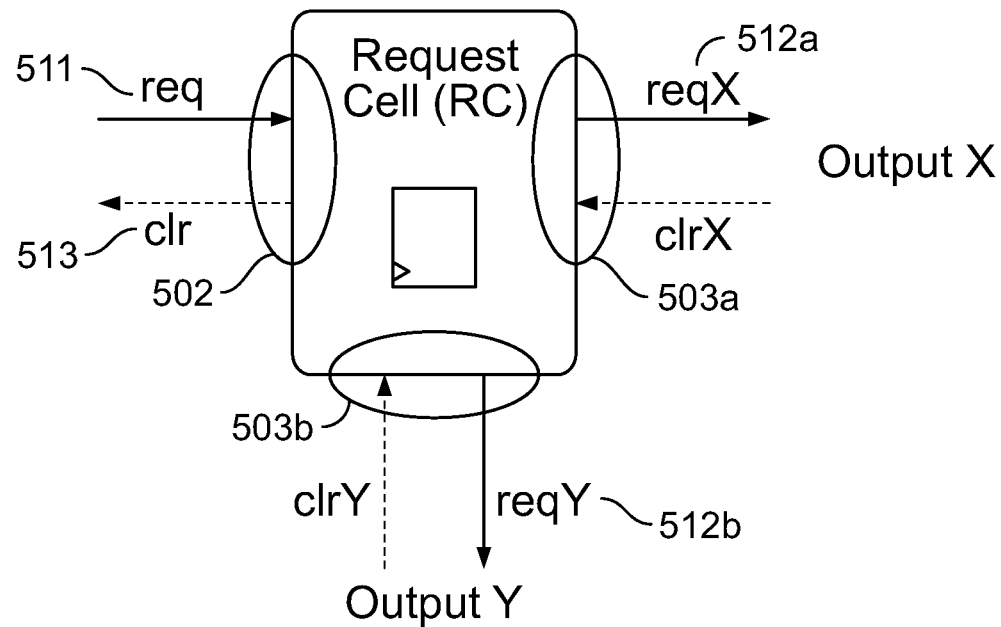
FIG. 5 is a block diagram illustrating an example structure of a request node 401, according to some embodiments described herein.

FIG. 5 is a block diagram illustrating an example structure of a request node 401, according to some embodiments described herein. The request cell 401 is a basic module that includes one input interface 502 and two output request interfaces 503a-b. The request cell 401 has a single stage of register buffering for the whole request packet. As shown in FIG. 5, the request packet is denoted as "req" 511 for input interface 502 and as "reqX" 512a or "reqY" 512b for output interface X or Y 503a or 503b. Here "X" stands for a sub-chain direction while "Y" stands for a main-chain direction. Each request interface 502 or 503a-b may include a FRAB request packet ("req" 511) and a clear signal ("clr" 513), where the clear signal 513 sends an indication that the request cell is clear and ready to receive a request packet.

The FRAB may use ID routing mechanism to transfer the request packet. Each request cell is associated with its own ID. When the FRAB has a main-chain 421 and a sub-chain 422, then the request cell ID field may be split into two parts, i.e. {reqidm, reqids}. The part {reqidm} is used for the routing in the main-chain while {reqids} is used for routing in the sub-chain. In some implementations, an additional sub-chain level may be added, and the number of ID parts in the ID field may be configured to be equivalent to the number of chain levels.

Each request cell 401 in the main chain has the unique ID part {e.g., reqidm} at the respective chain level. When receiving a request packet 511, the request cell 401 may compare its own ID with the corresponding upper bits in the ID field of a request packet 511 and then decide where to route the request packet. When the IDs are matched, the request packet 511 is first routed to the X interface, e.g., from the main chain to the sub-chain. When no match is identified, the request packet is then forwarded to the Y interface, i.e. the request packet is kept at the same main chain level.

Each request cell in the sub-chain has its unique ID {reqids} in this chain level. The routing at the sub-chain level is based on comparing {reqids} with the lower bits in the ID field of the request packet 511. The whole ID of request cell in the sub-chain includes the two parts {reqidm} and {reqids}, which is returned in the completion packet.

When the request packet 511 is for multicast access, the ID comparison at the sub-chain level may be ignored. The request packet 511 may first be routed to the Y interface (e.g., see output interface 503b) in the same sub-chain level, then to the X interface (e.g., see interface 503a), i.e. directing to an IP Register module. But the ID comparison in the main-chain may still be performed.

When a request cell is used as a buffers (e.g., see 412b-c, 413b-c or 414b-c in FIG. 4), then only the X interface 503a is used, i.e. the request packet 511 is routed to the X interface. The ID comparison is then unnecessary in this case.

An example request packet 511 may include three fields: a reqvalid field, a route ID field and an application packet field. An example data structure of the request packet 511 may take a form similar to the following:

```
req = {     reqvalid,
            //Route ID field
            reqid,
            reqtag,
            reqmulti,
            //Application Packet Field
            reqwr,
            reqadd,
            reqwdat,
            reqbe}
```

The "reqvalid" field indicates the request packet is available. The route ID field include {reqid, reqtag, reqmulti}. When the FRAB has two chain levels, e.g., a main-chain and a sub-chain, the {reqid} field is split into two parts, e.g., {reqidm, reqids}, where {reqidm} is ID part for the routing in main chain while {reqids} is for the routing in the sub-chain. Each ID part is a unique identifier in the same chain level in the FRAB hierarchy and is used to route a request packet. TAG is a sequence number used to track the request and completion packets. The field {reqmulti} indicates whether the request packet is multicast access. The application packet field includes a register access protocol which may includes a register address, a write date, a write enable, a read or write access etc. The application packet may not be touched during the routing and propagation through the FRAB hierarchy. So the application packet field comprises a specific protocol between IP and the software. The protocols may differ from each other, which allows different register interfaces to be connected to the same FRAB via their respective protocols.

In some implementations, the request cell generates a clear signal 513 to the previous connected request cell. When the clear signal is asserted, it means the current request cell is empty and is available for a new request packet. And the request packet in the previous request cell is valid and may be transferred to the current request cell at a following clock signal edge. The request packet may be received or transmitted via an communication (input or output) interface. The communication interface may be defined as a generic interface, with example interface signals as shown in Table 1.

TABLE 1

Example Request Interface Configuration of request cell

| Request Interface Signal | I or O | Descriptions |
|---|---|---|
| reqvalid | I or O | If 1'b1, it indicates the Request Packet is valid. Otherwise, the Request Packet is invalid and must be ignored. |
| reqid[7:0] | I or O | Consists of 2 ID parts: reqidm: reqid[7:4] is identifier for main-chain reqids: reqid[3:0] is identifier for sub-chain |
| reqtag[3:0] | I or O | A number assigned to a given request to track the request and its Completion Packets. |
| reqmulti | I or O | If 1'b1, it indicates the Request Packet is Multicast Access. In the sub-chain, if reqmulti, request cell will transfer the Request Packet first to its Y interface, then to X interface. In the main-chain, reqmulti is ignored. |
| reqwr | I or O | If 1'b1, Request Packet contains a write request, otherwise a read request |
| reqadd[15:0] | I or O | IP Register address |
| reqdat[31:0] | I or O | Write data |
| reqbe[3:0] | I or O | Write data enable |
| reqclr | O or I | Clear signal |

Figure 6:
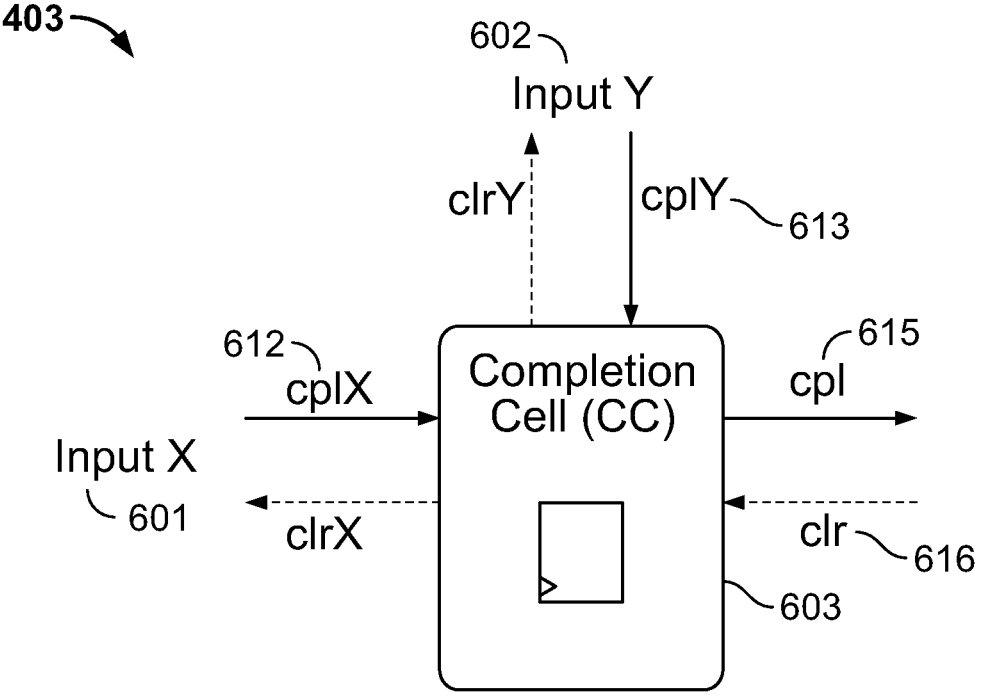
FIG. 6 is a block diagram illustrating an example structure of a completion node 403, according to some embodiments described herein.

FIG. 6 is a block diagram illustrating an example structure of a completion node 403, according to some embodiments described herein. The completion cell may be a basic module which includes two input interfaces (X input interface 601, Y input interface 602) and one output completion interface 603. The completion cell has a single stage of register buffering for the whole completion packet. As shown in FIG. 6, the signal "cpl" 615 stands for the output completion packet while "cplX" 613 or "cplY" 614 is the respective completion packet for input interface X or Y. The Y interface 602 may have higher priority than the X interface 601.

When a completion cell is configured as buffering, then only the X interface 601 is used. The completion interface may receive or transmit a completion packet ("cpl" 615) and a clear signal ("clr" 616). The completion packet may include three fields, a cplvalid filed, an ID-TAG field and an application packet field. An example data structure of the completion packet 615 may take a form similar to the following:

```
cpl= {      cplvalid,
            //ID-TAG field
            cplid,
            cpltag,
            //Application Packet Field
            cplstatus,
            cplwr,
            cpldat}
```

The "cplvalid" field indicates whether the completion packet is available. The ID-TAG field may include an ID field and a TAG field, where the ID is the unique identifier of the completion cell in the same FRAB hierarchy. The request cell and the completion cell in the sub-chain connected to the same IP Register module may have the same ID, e.g., see request cell 412a, completion cell 416a and IP[i, 0] in FIG. 4. The TAG field is a sequence number used to distinguish completion packets for the corresponding request. The application packet field may include the completion status and completion read data.

The completion cell 403 may generate a clear signal to the previous connected completion cells. When the clear signal is asserted, it means the current completion cell is empty and is available for accepting a new completion packet. And, the completion packet in one of previous completion cells is valid and will be transferred to the current completion cell at the following clock edge. The input of Y interface 602 may have a higher priority than the one of X interface 601. The input or output interface of a completion cell may be defined as a generic interface, with example interface signals as shown in Table 2.

TABLE 2

Example Completion Interface Configuration of completion cell

| Completion Interface Signal | I or O | Descriptions |
| --- | --- | --- |
| cplvalid | I or O | If 1'b1, it indicates the Completion Packet is valid. |
| cplid[7:0] | I or O | ID number of completion cell in the FRAB hierarchy. |
| cpltag[3:0] | I or O | TAG extracted from the corresponding TAG field of the Request Packet. |

TABLE 2-continued

Example Completion Interface Configuration of completion cell

| Completion Interface Signal | I or O | Descriptions |
| --- | --- | --- |
| cplstatus | I or O | Completion status. Defined encodings for this field are:<br>'b0: Successful Completion<br>'b1: Request Abort or timeout |
| cplwr | I or O | If 1'b1, it indicates a Completion Packet of a write request.<br>Otherwise, it's a read Completion Packet. |
| cpldat[31:0] | I or O | Completion data of a read request |
| cplclr | O or I | Clear signal |

Figure 7:
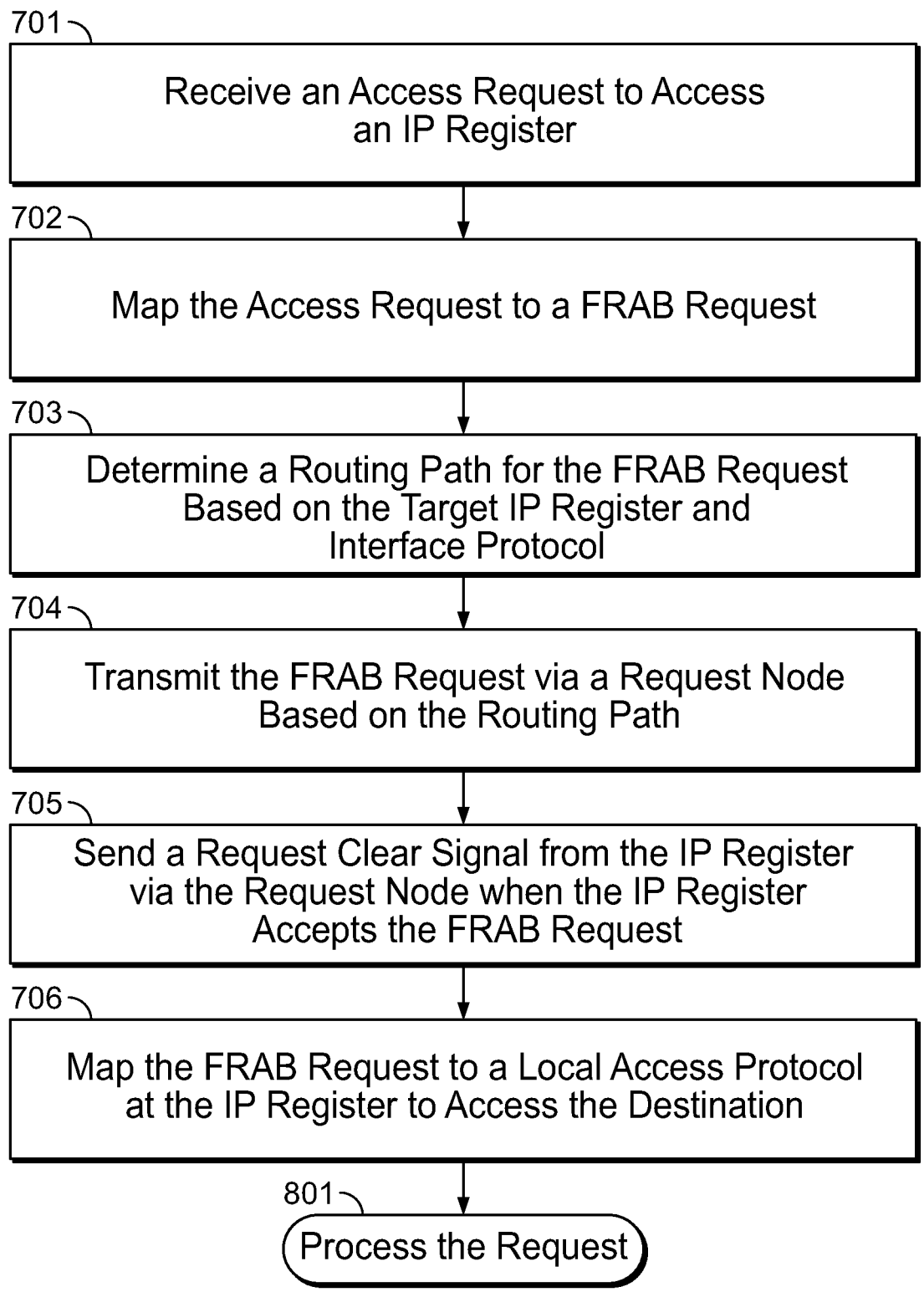
FIG. 7 provides an example logic flow diagram illustrating aspects of routing an access request to a target IP register via FRAB, according some embodiments herein.

FIG. 7 provides an example logic flow diagram illustrating aspects of routing an access request to a target IP register via FRAB, according some embodiments herein. At 701, an access request may be received from a host system, or from a loader, an embedded CPU, and/or the like. The loader, or the embedded CPU, similar to the host system, may be operated as a master and initiate the access to the IP register (or embedded memory) as slave. At 702, an AXI bridge (e.g., see block 330 in FIG. 3) may map the access request to a FRAB request, which may include data fields specific to the FRAB operation as discussed in connection with FIG. 3. For example, the FRAB request packet includes "reqid" field to route the packet to a target IP register. Each request packet may contain an application packet that comprises a dedicated register access protocol for the respective targeted IP register module. At 703, a routing path may be determined for the FRAB request packet based on the target IP register and the interface protocol. At 704, the FRAB request packet may be transmitted to a request node (e.g., see node 311a in FIG. 3) based on the routing path. At 705, when the IP register receives and accepts the FRAB request packet, the IP register may send a clear signal to the request node (e.g., see block 330 in FIG. 3). The clear signal generated by each cell may give an indication to the previous request/completion cell where the request/completion packet comes from. The protocol may be done in each request/completion interface. For example, when there are several cells between AXI bridge (e.g., see block 330 in FIG. 3) and IP registers, the clear signal generated from IP register may be terminated in the neighbor request cell and may not be forwarded to any other request cells toward the main chain or AXI bus. At 706, the IP register may map the FRAB request packet to a local access protocol in order to access the destination, e.g., IP registers or memories [refer to Comment 2 in [0037]]. The IP register may then proceed to process the FRAB request at 801 in FIG. 8.

Figure 8:
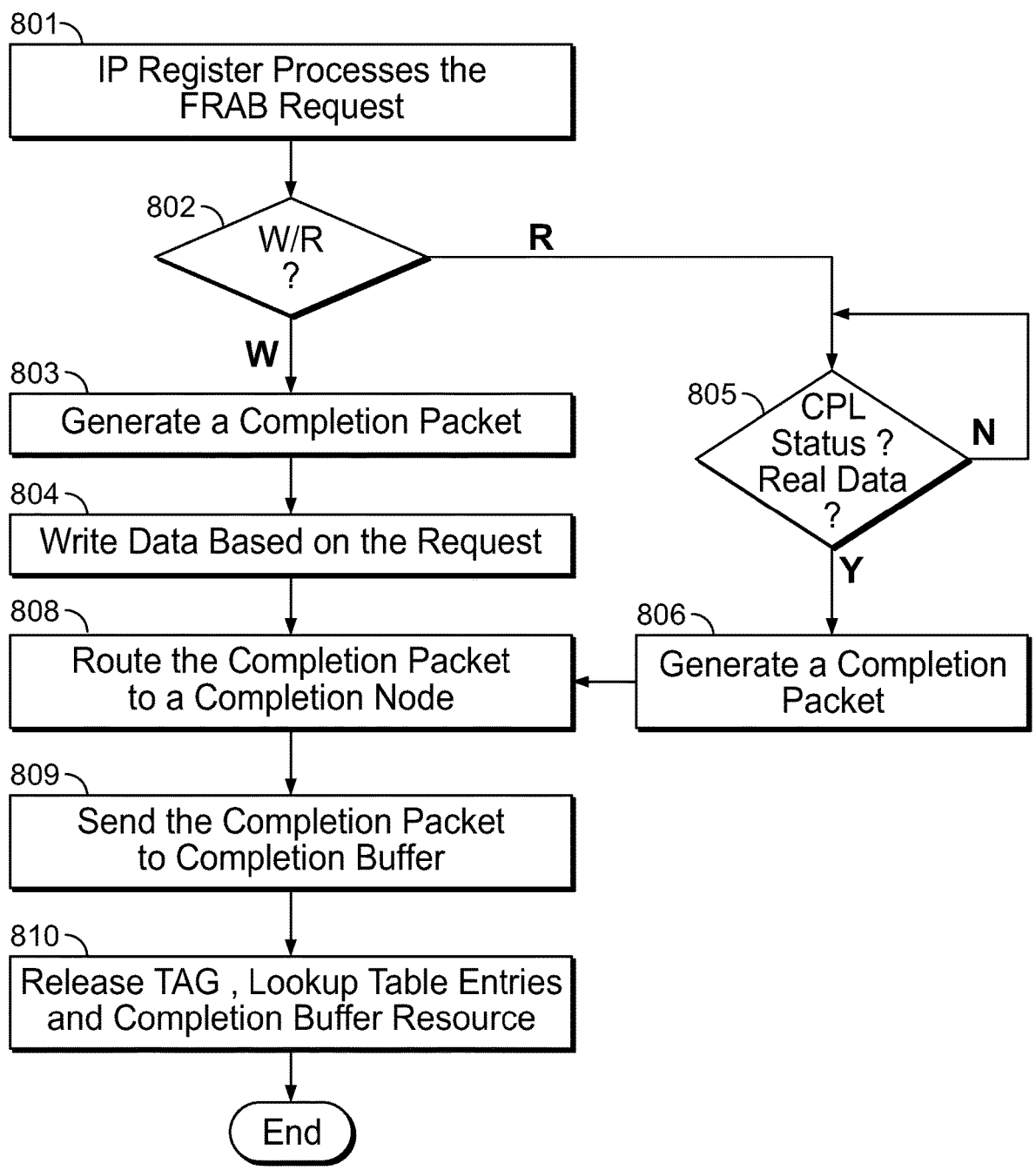
FIG. 8 provides an example logic flow diagram illustrating aspects of completing an access request from the FRAB, according some embodiments herein.

FIG. 8 provides an example logic flow diagram illustrating aspects of completing an access request from the FRAB, according some embodiments herein. At 801, the IP register may process the FRAB request. For example, at 802, when a write request is received at the IP register via the request packet, the completion status can be generated at 803 as soon as the write request is accepted by the IP register because no completion data is expected. And the write data operation may be performed based on the request at 804. When a read request is received at the IP register at 802, the completion packet may be generated at 806 when the completion status and completion read data are available at 805. Otherwise, at 805, the IP register may wait until the completion status and completion read data are ready. At 808, the completion packet is then routed to a completion node. For example, the completion status and completion read data are then transferred into the completion cell in the sub-chain. At 809, the completion packet is further sent through the main chain into the completion buffer (e.g., see completion buffer 316 in FIG. 3) in the AXI-to-FRAB bridge (e.g., see bridge 330 in FIG. 3). At 810, as discussed in connection with FIG. 3, the TAG, lookup table entries and completion buffer resources are released to mark the completion of the access request.

The FRAB architecture that allows flexible access to different IP register modules may improve data performance of a SOC system. For example, consider a SOC with 256 identical IP register modules connected to the FRAB fabric, with a similar grid topology shown in FIGS. 3-4: the FRAB fabric has a main chain with 16 nodes and each main chain has a sub-chain with 16 request cells and completion cells connected to each IP register module; two request cells are used as buffer between the request cell in the sub-chain and the corresponding IP register module; each IP Register module is assumed to have six FRAB fabric clocks for the completion of a read or write request; the FRAB fabric runs at 250 MHz; and the cycle time is 4 ns. An initial latency (Tinit), defined as a time interval between issuing a FRAB request and receiving its completion, can be calculated as below:

$$T\text{init}=[(16+16+4)+6]\times 4 \text{ ns}=(36+6)\times 4 \text{ ns}=42\times 4 \text{ ns}=168 \text{ ns}.$$

Here 36 is the number of request cells and completion cells where the request and its completion may go through. The initial time may be the same for a request to any IP register module connected to the FRAB.

The FRAB fabric may accept a request every two cycles when no back pressure happens. If the FRAB fabric supports 16 pipeline requests, then the average latency (Tav) in this example can be calculated as:

$$T\text{av}=42/16\times 4 \text{ ns}=10.5 \text{ ns}$$

If the FRAB fabric supports more than 21 pipeline requests, then the average latency may be:

$$T\text{av}=2.02\times 4 \text{ ns}=8.02 \text{ ns}$$

When all pipeline requests are targeted at the same IP Register module, then the average latency is determined by the completion time of the IP Register module, i.e. six cycles in this example.

For this example, the FRB can also be constructed with one main-chain level and two sub-chain levels. Each level may have seven, seven and six nodes, for request cells or completion cells. Then ID field is split into three parts, each part having a 3-bit width. This topology may support a maximal number of IP register modules 7×7×6=294, which is sufficient for the respective example with 256 IP Register modules. Then the initial latency can be calculated as:

$$T\text{init}=[(7+7+6+5)+6]\times 4 \text{ ns}=(25+6)\times 4 \text{ ns}=31\times 4 \text{ ns}=124 \text{ ns}.$$

Here 25 is the number of request cells and completion cells where the request and its completion go through.

When the request/completion data bus has a width of 32 bits, the example net performance estimation may be illustrated in Table 3.

TABLE 3

Example FRAB Performance

| FRAB Topology | Case | Cycle number | Latency (cycle time of 4 ns) | Net Performance (request/completion data width of 32 bits) |
|---|---|---|---|---|
| FRAB with 1 Sub-chain | Single request | 42 | Tinit = 168 ns | 190 Mbit/s |
| | 16 pipeline requests | 2.625 | Tav = 10.5 ns | 3047 Mbit/s |
| | >=21 pipeline requests | 2.02 | Tav = 8.08 ns | 3960 Mbit/s |
| FRAB with 2 Sub-chains | Single request | 31 | Tinit = 124 ns | 258 Mbit/s |

While this specification contains many specifics, these should not be construed as limitations on the scope of what may be claimed, but, rather, as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory or transitory medium that provides or participates in providing instructions to a processor of the computing device (e.g., the host system 101 in FIG. 2, or any other processor of a device described herein) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for transmitting an access request via a flexible register access bus, the method comprising:
    receiving an access request to access resource on an integrated circuit;
    translating the access request to a request packet having a data format compliant with the flexible register access bus;
    determining a routing path for the request packet based on a target register associated with the request packet;
    transmitting, via the routing path, the request packet to the target register; translating information within the request packet to a local access protocol for the target register;
    obtaining access to the resource via the target register based on the local access protocol;
    generating, via the target register, a completion packet; and
    routing, via one or more completion nodes of a completion node chain, the completion packet to a completion buffer of a bridge component to indicate that the access request is completed, the one or more completion nodes including a last completion node of the completion node chain.

2. The method of claim 1, wherein the request packet includes an identifier identifying the target register and an application packet having data relating to the local access protocol.

3. The method of claim 1, wherein the routing path includes a plurality of interconnected request cells that the request packet is passed through, and wherein at least one of the plurality of interconnected request cells is connected to the target register.

4. The method of claim 3, wherein each request cell from the plurality of request cells has a first communication port for transmitting the request packet, and a second communication port for transmitting a clear signal.

5. The method of claim 3, wherein each request cell includes an identifying number that identifies a position of the respective request cell in a topology of the plurality of request cells.

6. The method of claim 5, wherein the request packet includes information of the identifying number, and the routing path is determined based on the identifying number.

7. The method of claim 1, further comprising:
    generating, via the target register, a request clear signal to indicate the target register is ready to receive a next request packet.

8. The method of claim 1, wherein the completion packet includes a number identifying the completion packet as associated with the access request.

9. The method of claim 1, wherein the flexible register access bus is connected to a plurality of registers, each of the plurality of registers having a respective local access protocol, and the method further comprising:
    receiving a next access request to access a different resource via a different target register on the integrated circuit, and
    converting the next access request via the flexible register access bus to comply with a different local access protocol associated with the different target register.

10. An apparatus for transmitting an access request via a flexible register access bus, the apparatus comprising:
    a bridge component configured to:
        receive an access request to access resource on an integrated circuit,
        translate the access request to a request packet having a data format compliant with the flexible register access bus, and
        determine a routing path for the request packet based on a target register associated with the request packet;
    a request node configured to route the request packet to the target register, wherein the target register configured to:
        translate information within the request packet to a local access protocol;
        provide access to the resource based on the local access protocol;
        and generate a completion packet; and
    a completion node chain having a plurality of completion nodes, wherein completion nodes of the completion node chain are configured to route the completion packet via the last completion node of the completion node chain to a completion buffer of the bridge component to indicate that the access request is completed.

11. The apparatus of claim 10, wherein the request packet includes an identifier identifying the target register and an application packet having data relating to the local access protocol.

12. The apparatus of claim 10, wherein the routing path includes a plurality of interconnected request cells that the request packet is passed through, and wherein at least one of the plurality of interconnected request cells is connected to the target register.

13. The apparatus of claim 12, wherein each request cell from the plurality of request cells has a first communication port for transmitting the request packet, and a second communication port for transmitting a clear signal.

14. The apparatus of claim 12, wherein each request cell includes an identifying number that identifies a position of the respective request cell in a topology of the plurality of request cells.

15. The apparatus of claim 14, wherein the request packet includes information of the identifying number, and the routing path is determined based on the identifying number.

16. The apparatus of claim 10, wherein the target register is further configured to:
    generate a request clear signal to indicate the target register is ready to receive a next request packet.

17. The apparatus of claim 10, wherein the completion packet includes a number identifying the completion packet as associated with the access request.

18. The apparatus of claim 10, wherein the flexible register access bus is connected to a plurality of registers, each of the plurality of registers having a respective local access protocol, and the bridge component is further configured to:

receive a next access request to access a different resource via a different target register on the integrated circuit, and convert the next access request via the flexible register access bus to comply with a different local access protocol associated with the different target register.

* * * * *